(12) United States Patent
Chen et al.

(10) Patent No.: US 10,793,716 B2
(45) Date of Patent: Oct. 6, 2020

(54) RESIN COMPOSITION AND USES OF THE SAME

(71) Applicant: Taiwan Union Technology Corporation, Chupei, Hsinchu County (TW)

(72) Inventors: Meng-Huei Chen, Chupei (TW); Shur-Fen Liu, Chupei (TW)

(73) Assignee: TAIWAN UNION TECHNOLOGY CORPORATION, Chupei, Hsinchu County (TW)

( * ) Notice: Subject to any disclaimer, the term of this patent is extended or adjusted under 35 U.S.C. 154(b) by 396 days.

(21) Appl. No.: 13/834,341

(22) Filed: Mar. 15, 2013

(65) Prior Publication Data

US 2014/0255711 A1   Sep. 11, 2014

(30) Foreign Application Priority Data

Mar. 7, 2013 (TW) .............................. 102108029 A

(51) Int. Cl.
| | | |
|---|---|---|
| *C08L 71/12* | (2006.01) | |
| *B32B 15/14* | (2006.01) | |
| *C08J 5/24* | (2006.01) | |
| *B32B 15/20* | (2006.01) | |
| *B32B 5/02* | (2006.01) | |

(52) U.S. Cl.
CPC ............ *C08L 71/123* (2013.01); *B32B 15/14* (2013.01); *B32B 15/20* (2013.01); *C08J 5/24* (2013.01); *C08L 71/126* (2013.01); *B32B 5/02* (2013.01); *B32B 2260/046* (2013.01); *B32B 2262/101* (2013.01); *C08L 2205/05* (2013.01); *Y10T 428/31692* (2015.04)

(58) Field of Classification Search
CPC .. C08L 9/00; C08L 9/06; C08L 71/126; C08L 2666/08
See application file for complete search history.

(56) References Cited

U.S. PATENT DOCUMENTS

| | | | |
|---|---|---|---|
| 5,218,030 A | | 6/1993 | Katayose et al. |
| 5,275,878 A | * | 1/1994 | Yamakawa ............... C08K 7/22 428/304.4 |
| 6,780,943 B2 | | 8/2004 | Liu et al. |
| 7,413,791 B2 | * | 8/2008 | Inoue ..................... B32B 15/14 428/141 |
| 7,638,564 B2 | | 12/2009 | Amou et al. |
| 8,034,442 B2 | | 10/2011 | Kaneko et al. |
| 8,269,115 B2 | | 9/2012 | Su |
| 8,703,277 B2 | | 4/2014 | Tokiwa et al. |
| 8,871,870 B2 | * | 10/2014 | He ....................... C09D 147/00 525/232 |
| 2003/0125475 A1 | * | 7/2003 | Sasagawa ................ C08F 8/04 525/332.8 |
| 2003/0215588 A1 | * | 11/2003 | Yeager ................. C08F 279/02 428/35.7 |
| 2004/0220323 A1 | * | 11/2004 | Gu ......................... C08L 53/02 524/515 |
| 2007/0077413 A1 | | 4/2007 | Amou et al. |
| 2007/0112102 A1 | * | 5/2007 | Kluttz .................... C08L 95/00 524/59 |
| 2008/0038528 A1 | * | 2/2008 | Paul ........................ B32B 7/12 428/219 |
| 2008/0261472 A1 | | 10/2008 | Amou et al. |
| 2010/0012884 A1 | * | 1/2010 | Nakamichi ............. C08L 15/00 252/70 |
| 2010/0129676 A1 | * | 5/2010 | Fujimoto ............... B32B 15/14 428/462 |
| 2010/0233495 A1 | * | 9/2010 | Mizuno ................... C08J 3/243 428/462 |

(Continued)

FOREIGN PATENT DOCUMENTS

| | | |
|---|---|---|
| CN | 1944557 A | 4/2007 |
| JP | 56133355 A  * | 10/1981 |

(Continued)

OTHER PUBLICATIONS

Polybutadiene, Wikipedia, the free encyclopedia, https://en.wikipedia.org/wiki/Polybutadiene, printed on Mar. 9, 2016.*

(Continued)

*Primary Examiner* — Monique R Jackson
(74) *Attorney, Agent, or Firm* — McClure, Qualey & Rodack, LLP

(57) ABSTRACT

A resin composition is provided. The resin composition comprises:

(a) a resin of formula (I):

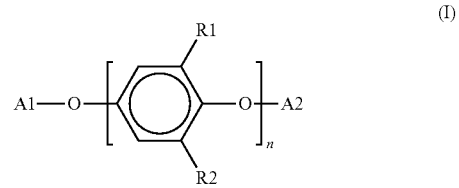

(b) a nonpolar elastomer containing vinyl group, wherein the content of the vinyl group is no more than 60%; and (c) a peroxide as a polymerization initiator, wherein, R1, R2, A1, A2, and n are as defined in the specification; and the content of component (b) is about 2% to about 100% based on the weight of component (a), and the content of component (c) is about 0.01% to about 10% based on the total weight of component (a) and component (b).

10 Claims, No Drawings

(56) References Cited

U.S. PATENT DOCUMENTS

| | | | |
|---|---|---|---|
| 2010/0307803 A1* | 12/2010 | Paul | B32B 7/12 |
| | | | 174/257 |
| 2011/0088933 A1* | 4/2011 | Amou | H05K 3/385 |
| | | | 174/257 |
| 2013/0180770 A1* | 7/2013 | Su | H05K 3/022 |
| | | | 174/258 |
| 2013/0266779 A1 | 10/2013 | Tokiwa et al. | |

FOREIGN PATENT DOCUMENTS

| | | | |
|---|---|---|---|
| JP | 06184213 A | * | 7/1994 |
| JP | 2011001473 A | * | 1/2011 |
| TW | 200846398 | | 12/2008 |
| TW | 201124478 | | 7/2011 |
| WO | WO 2012/081705 A1 | | 6/2012 |

OTHER PUBLICATIONS

Styrene-butadiene, Wikipedia, the free encyclopedia, https://en.wikipedia.org/wiki/Styrene-butadiene, printed on Mar. 9, 2016.*

Polyisoprene: Chemical compound, Encyclopedia Britannica, http://www.britannica.com/science/polyisoprene, printed on Mar. 9, 2016.*

Kerns, M., Henning, S. and Rachita, M., "Butadiene Polymers", 2002, Encyclopedia of Polymer Science and Technology, vol. 5, pp. 317-356.*

EPO Machine translation of JP06184213A published Jul. 5, 1994.*

RICON 130, Technical Data Sheet, Cray Valley, May 2010.*

RICON 131, Technical Data Sheet, Cray Valley, Jun. 2010.*

RICON 157, Technical Data Sheet, Cray Valley, Jul. 2010.*

RICON 184, Technical Data Sheet, Cray Valley, Aug. 2010.*

RICON 184 Maleinized Polybutadiene, Application Bulletin, Cray Valley, Jan. 2010.*

RICON 184MA6, Technical Data Sheet, Cray Valley, Aug. 2010.*

Peters, PPE Macromonomers. IX. Performance Enhancements of Triallyl Isocyanurate Resins, 2011, Society of Plastic Engineers, ANTEC 2011, pp. 2823-2826. (Year: 2011).*

Chinese Office Action for Application No. 201310081083.7, dated Dec. 14, 2015 (8 pages).

Product Brochure: Cray Valley Resins par excellence, Application Bulletin, "Rincon® 130 Maleinized Polybutadiene," "Techical Data Sheet: Rincon® 157," and "Cariflex® Polyisoprene Rubber," Total, Exton, PA, no date indicated (3 pgs).

Product Brochure: Hydrogenated Styrenic Thermoplastic Elastomer | Asahi Kasei Chemicals Corporation, Tokyo, Japan, "Product Information Tuftec™,"[https://www.akelastomer.com/eng/products/tuftec.html] May 26, 2016 (2 pgs).

Product Brochure: SEBS plastic, [http://www.ponci/com/cn/te/sebs-plastic/] Ponci, Shanghai Ponci Trading Co., Ltd., Shanghai, People's Republic of China, May 26, 2016 (3 pgs).

Product Brochure: "Liquid Butadiene Oligomer," Mitsubishi International. PolymerTrade Corporation, Newark, NJ [http://www.micchem.com/liquid_butadiene_oligomer.html] May 26, 2016 (3 pgs).

Product Brochure: "JSR RB Syndiotactic 1, 2-Polybutadiene," JSR Life Sciences, Materials Innovation, JSR Life Sciences Corporation, Ibaraki, Japan (1 pg).

Taiwan Office Action for Taiwan Application No. 102108029, dated Jun. 10, 2014. English translation not provided.

* cited by examiner

RESIN COMPOSITION AND USES OF THE SAME

This application claims priority to Taiwan Patent Application No. 102108029 filed on Mar. 7, 2013 said application being hereby fully incorporated herein by reference.

CROSS-REFERENCES TO RELATED APPLICATIONS

Not applicable.

BACKGROUND OF THE INVENTION

Field of the Invention

The present invention relates to a resin composition. Specifically, the present invention relates to a resin composition comprising an allyl-containing polyphenylene ether resin, a nonpolar elastomer, and an initiator, and a prepreg and laminate prepared using the same.

Description of the Related Art

Printed circuit boards (PCBs) are circuit substrates that are used for electronic devices to load other electronic components and to electrically connect the components to provide a stable circuit working environment. One kind of conventional printed circuit board is a copper clad laminate (CCL), which is primarily composed of resin(s), reinforcing material(s) and copper foil(s). Conventional resins include epoxy resins, phenolic resin, polyamine formaldehyde resins, silicone resins or polytetrafluoroethylene resins; and conventional reinforcing materials include glass fiber cloths, glass fiber mats, insulating papers or linen cloths.

In general, a printed circuit board can be prepared using the following method: immersing a reinforcing material, such as glass fiber fabric into a resin (such as epoxy resin), and curing the immersed glass fiber fabric into a half-hardened state, i.e., B-stage, to obtain a prepreg; superimposing certain layers of the prepregs and superimposing a metal foil on at least one external surface of the superimposed prepregs to provide a superimposed object; hot-pressing the superimposed object, i.e., C-stage, to obtain a metal clad laminate; etching the metal foil on the surface of the metal clad laminate to form a defined circuit pattern; and finally, drilling a plurality of holes on the metal clad laminate and plating these holes with a conductive material to form via holes to accomplish the preparation of the printed circuit board.

Laminates prepared by using an epoxy resin may be provided with proper physicochemical properties such as heat resistance, chemical stability, mechanical strength, etc. However, the laminates thus prepared are also provided with a high dielectric constant (Dk), a high dissipation factor (Df), and high H$_2$O absorption rate, which all lead to the deterioration of the signal transmission quality (e.g., a slow signal transmission rate and signal loss). As a result, the laminates prepared by using an epoxy resin are gradually failing to meet the requirements for high frequency and high-speed signal transmission for smaller, lighter, and thinner electronic products. Hence, it is the main purpose to develop a substrate material meeting the requirements such as low Dk, low Df, high heat resistance and high glass transition temperature (Tg).

The polyphenylene ether resin has excellent electrical properties and good chemical resistances (e.g., corrosion resistance, acid and alkali resistance), and thus, is often added to the epoxy resin as a substance material. However, the polyphenylene ether resin is a thermally plastic resin, thus being poor in the heat resistance (high temperature stability), and is easily soluble in halogenated solvents and aromatic solvents. For use as a printed circuit board material, it needs to further improve the chemical resistance and heat resistance of the polyphenylene ether resin. In this regard, TW Patent No. 574313 provides a resin composition for producing laminates, which lowers the Dk and Df of the printed circuit broads by adding polyphenylene ether resin and bismaleimide into the epoxy resin. However, in practical application, due to the difference in the polarity of chemical structure, polyphenylene ether resin and epoxy resin are poorly compatible with each other, making it difficult to process and limiting the usage of the resin composition. It is also hard to sufficiently utilize the properties of polyphenylene ether resin in the composition.

U.S. Pat. No. 5,218,030 disclosed a resin composition using a vinyl-containing (or allyl-containing) polyphenylene ether resin blended with triallyl isocyanurate (TAIC). Although the resin composition can avoid the disadvantages of using epoxy resins, the laminate, thus prepared from those materials, lacks a sufficient heat resistance property and has poor processability. For example, cracks are easily generated during the processing due to overly high hardness of the thus prepared laminates. U.S. Pat. No. 8,034,442 B2 disclosed a resin composition, which comprises bismaleimide diphenylmethane resin, alkenylphenol ether compounds, polyimide, and TAIC. The resin composition is capable of providing a laminate with excellent heat resistance but poorer electrical properties, and the cost is high. The resin composition is thus suitable to produce a high level laminate requiring extremely high heat resistance merely.

CN 101544841 disclosed a resin composition, which improves the electrical properties of the laminates thus prepared by adding a vinyl-containing elastomer resin. The subject inventors, however, found that, for the preparation of laminates using polypheneylene ether resin compositions, not all of the vinyl-containing elastomer resins can enhance the performances of the laminates thus prepared.

SUMMARY OF THE INVENTION

The subject inventors developed and found that by adding a nonpolar vinyl-containing elastomer into the resin composition for preparing a laminate, wherein the content of the vinyl group contained in the elastomer is no more than 60%, not only the electrical properties of the thus prepared laminate are reduced, but its physicochemical properties are also improved, such as moisture resistance, flame retardance, glass transition temperature (Tg).

Therefore, one object of the present invention is to provide a resin composition, comprising:

(a) a resin of formula (I):

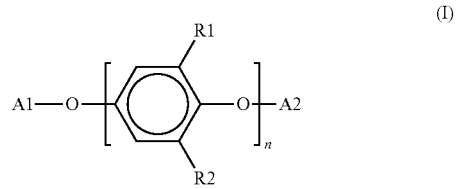

(b) a nonpolar vinyl-containing elastomer, wherein the content of the vinyl group contained in the elastomer is no more than 60%; and (c) a peroxide as a polymerization initiator, wherein, R1 and R2 are independently H or a substituted or unsubstituted C1-C10 alkyl;

A1 and A2 are independently an vinyl-containing or allyl-containing group;

n is an integer ranging from 10 to 40;

the amount of component (b) is about 2% to about 100% based on the weight of component (a), and the amount of component (c) is about 0.01% to about 10% based on the total weight of component (a) and component (b).

Another object of embodiments of the invention is to provide a prepreg, which is prepared by immersing a substrate into the resin composition described above, and drying the immersed substrate.

Yet a further object of embodiments of the invention is to provide a laminate, comprising a synthetic layer and a metal layer, wherein the synthetic layer is made from the prepreg described above.

To render the above objects, technical features and advantages of the present invention more apparent, the present invention will be described in detail with reference to some embodiments hereinafter.

DETAILED DESCRIPTION OF THE INVENTION

Hereinafter, some embodiments of the present invention will be described in detail. However, the present invention may also be practiced in various different forms without departing from the spirits of the present invention. The scope of the present invention shall not be considered to be limited to what is illustrated herein. In addition, unless it is additionally explained, the expressions "a," "the," or the like recited in the specification (especially in the claims) should include the singular and the plural forms. The term "substituted" recited in the specification means that H is substituted by a substituent which can be any groups or atoms other than H. Furthermore, unless it is additionally explained, while describing the constituents in the solution, mixture and composition in the specification, the amount of each constituent is counted based on the solid content, i.e., disregarding the weight of the solvent.

The present invention provides a resin composition for the laminate manufacturing field, comprising a vinyl-containing or allyl-containing polyphenylene ether resin, a nonpolar vinyl-containing elastomer, and a polymerization initiator. Under development, it is found that if the added vinyl-containing elastomer is polar, or the content of the vinyl group contained in the added nonpolar vinyl-containing elastomer is overly high or the added amount of the nonpolar vinyl-containing elastomer is overly high, it is disadvantageous to the physicochemical and electrical properties of the thus prepared laminates. Therefore, one feature of the resin composition of the present invention lies in the selection of a nonpolar vinyl-containing elastomer meeting the defined content of the vinyl group in a certain amount. The laminate manufactured by using the resin composition of the present invention is provided with outstanding physicochemical properties (e.g., high Tg, low $H_2O$ absorption, good solder resistance, good flame retardance, etc.) and electrical properties (low Df, Dk).

Specifically, the resin composition of the invention comprises (a) a resin of formula (I), (b) a nonpolar vinyl-group elastomer, and (c) a peroxide as a polymerization initiator.

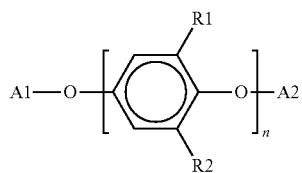

In the resin composition of the present invention, by combining (a) the resin of formula (I) and (b) the nonpolar vinyl-containing elastomer, the disadvantages of using polyphenylene ether resin alone (e.g., the prepared material is provided with poor heat resistance) can be eliminated and a material with the desired properties (e.g., high Tg, low Dk, low Df, good solder resistance, good flame retardance, etc.) can be provided. In formula (I), R1 and R2 are independently H or a substituted or unsubstituted C1-C10 alkyl, A1 and A2 are independently a vinyl-containing or allyl-containing group, and n is an integer ranging from 10 to 40. Preferably, R1 and R2 are independently H or a substituted or unsubstituted methyl; and A1 and A2 are independently selected from a group consisting of

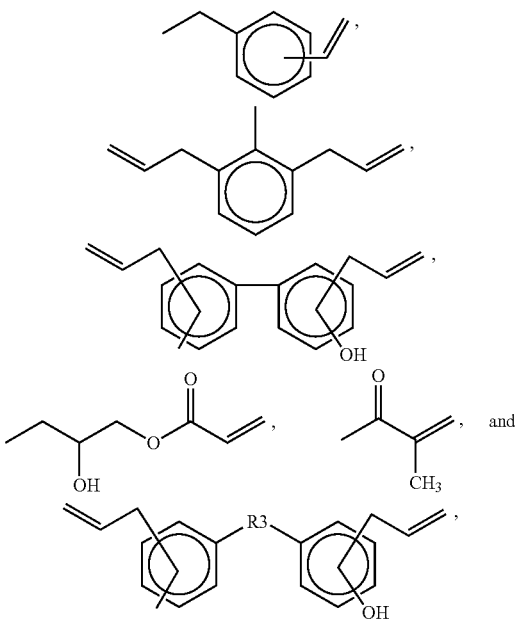

and R3 is —O— or —$SO_2$—. In some embodiments of the present invention, both R1 and R2 are $CH_3$, and both A1 and A2 are

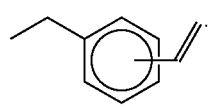

In the resin composition of the present invention, (b) the nonpolar vinyl-containing elastomer can be any nonpolar elastomer with a content of vinyl group of no more than 60%. In the resin composition of the present invention, (b) the nonpolar vinyl-containing elastomer can be any nonpolar elastomer with a content of vinyl group of no more than 60%. The "content of the vinyl group of no more than 60%" used herein means the total content of the vinyl group contained in all of the used elastomer. For example, in the case of using a single species of nonpolar vinyl-containing elastomer, the content of the vinyl group contained in the elastomer must be no more than 60%. In the case of using multiple nonpolar vinyl-containing elastomers, it only needs that the sum of the content of the vinyl group contained in each elastomer is no more than 60% and the content of the vinyl group contained in each elastomer is not concerned. In other words, it is possible to combine a nonpolar elastomer with a content of vinyl group of more than 60% with a nonpolar elastomer with a content of vinyl group of less than 60% as long as the total content of the vinyl group is no more than 60%. The example of component (b) used in the resin composition of the present invention comprises, but is not limited to, the following group: polybutadiene, polyisoprene, styrene-containing polymers, and combinations thereof. The styrene-containing polymers are such as butadiene-styrene copolymers or styrene-isoprene copolymers. Commercially available polybutadiene product is such as Ricon 130 and Ricon 157 of Cray Valley. Commercially available polyisoprene product is such as Cariflex IR of Kraton. Commercially available butadiene-styrene copolymer product is such as Ricon 181 and Ricon 100 of Cray Valley and DX480 JOP of Kraton. Commercially available styrene-isoprene copolymer product is such as D1111 of Kraton. In some embodiments of the present invention, Ricon 130, Ricon 157, Cariflex IR or a combination thereof is used as (b) nonpolar vinyl-containing elastomer, and the (total) content of the vinyl group is about 5% to about 35%.

Component (c) is a peroxide as a polymerization initiator. The species of the peroxide is not particularly limited as long as it is capable of initiating the polymerization. In some embodiments of the present invention, benzoperoxide is used as the initiator.

In the resin composition of the present invention, the content of component (b) is about 2% to about 100%, preferably, about 5% to about 50%, based on the weight of component (a); and the content of compound (c) is about 0.01% to about 10%, based on the total weight of component (a) and component (b). If the content of component (b) is too low, it may not be able to provide a desired improving effect, thus resulting in poor physicochemical properties of the prepared laminate; in addition, if the content of component (b) is too high, it is also disadvantageous to the physicochemical or electrical properties of the prepared laminate. Moreover, if the content of compound (c) is too low, it may not be able to effectively promote the conduction of the polymerization; if the content of component (c) is too high, it may cause the polymerization rate too fast, thus disadvantageous to the process operation. In some embodiments of the present invention, the content of component (b) is about 10% to about 20% based on the weight of component (a); and the content of compound (c) is about 1% to about 4% based on the total weight of component (a) and component (b).

To enhance the properties of the prepared laminates, the resin composition of the present invention may optionally add a cross-linking agent capable of forming an interpenetrating polymer network (IPN) to further improve the physicochemical properties and electrical properties of the laminates thus prepared (such as high Tg, low H$_2$O absorption, low Dk, low Df). The "IPN structure" means a network structure formed from two or more polymers by interpenetrating their molecular chains and crosslinking them in chemical bond. The example of the cross-linking agent can be, for example, selected from the group consisting of phenolic resin, styrene maleic anhydride (SMA) resin, bismaleimide (BMI) resin, vinyl-containing or allyl-containing isocyanurate and combinations thereof. In the case of BMI resin, it can have the structure of formula (II):

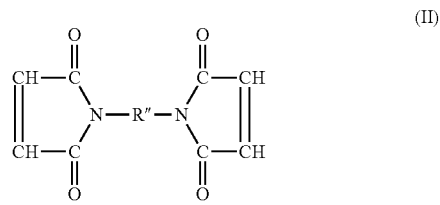

(II)

wherein, R" is substituted or unsubstituted methylene, 4,4'-diphenylmethane, m-phenylene, bisphenol A diphenyl ether, 3,3'-dimethyl-5,5'-diethyl-4,4'-diphenyl methane, 4-methyl-1,3-phenylene, or (2,2,4-trimethyl)hexane. Preferably, R" is CH$_2$,

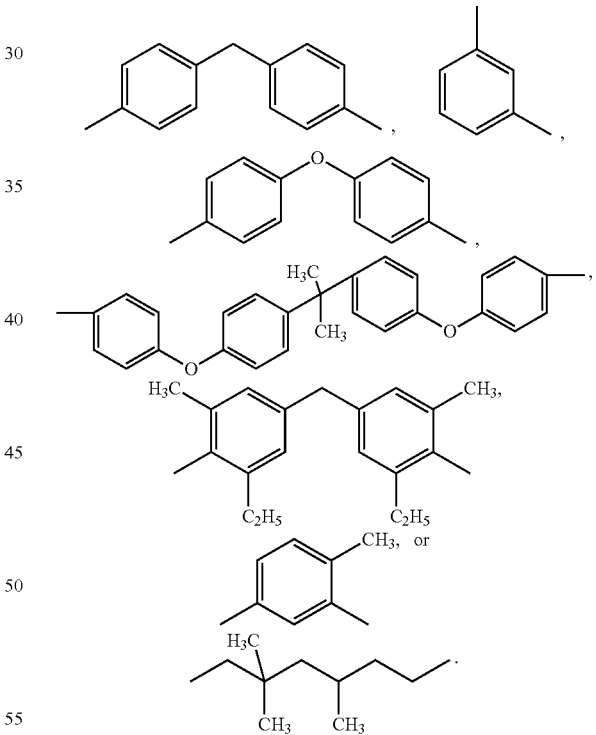

In some embodiments of the present invention, TAIC and/or BMI resin with formula (II) (R" is CH$_2$) is used as the cross-linking agent. Moreover, based on the weight of component (a), the added amount of the cross-linking agent is normally about 10% to about 200%, preferably about 10% to about 70%. Nonetheless, the amount can be adjusted depending on user's needs, and is not limited to the above values.

The resin composition of the present invention may optionally comprise other additives, such as a filler, a flame retardant, a hardening promoter, a dispersing agent, a flexibilizer, etc., and those additives may be taken alone or in combination. For example, a filler selected from a group consisting of silica, glass powder, talc, kaolin, pryan, mica, inorganic metal oxides (such as aluminum oxide, zirconium oxide), and a combination thereof, but not limited thereto, may be added to improve the properties of the manufactured material (e.g., the processability, heat resistance, moisture resistance, etc.). A phosphorous flame retardant or bromine-containing flame retardant (such as decabromobibenzyl, DBDPE), but not limited thereto, may be added to enhance the flame retardance of the manufactured material. A hardening promoter can also be added to improve hardness effect. As for the amount of those additives, it can be adjusted depending on the needs of persons with ordinary skill in the art based on the disclosure of the specification, and is not particularly limited.

The resin composition of the present invention may be prepared into varnish form by evenly mixing component (a), component (b), and compound (c) through a stirrer and dissolving or dispersing the mixture into a solvent, for subsequent applications. The solvent here can be any solvent which can dissolve (or disperse) but not react with the components of the resin composition of the present invention. For example, the solvent which can dissolve or disperse the resin composition of the present invention may be selected from the group consisting of toluene, γ-butyrolactone, methyl ethyl ketone, cyclohexanone, butanone, acetone, xylene, methyl isobutyl ketone, N,N-dimethyl formamide (DMF), N,N-dimethyl acetamide (DMAc), N-methyl-pyrolidone (NMP), and mixtures thereof, but is not limited thereto. The amount of the solvent is not particularly limited as long as the components of the resin composition can be evenly mixed. In some embodiments of the present invention, a mixture of toluene and γ-butyrolactone is used as the solvent.

The present invention further provides a prepreg which is obtained by adhering the abovementioned resin composition to a substrate (a reinforcing material) surface completely and drying the adhered substrate. A conventional reinforcing material includes a glass fiber cloth (a glass fabric, a glass paper, a glass mat, etc.), a kraft paper, a short fiber cotton paper, a nature fiber cloth, an organic fiber cloth, etc. In some embodiments of the present invention, 2116 glass fiber cloths are illustrated as the reinforcing materials, and heated and dried at 175° C. for 2 to 10 minutes (B-stage) to provide half-hardened prepregs.

The abovementioned prepregs can be used for manufacturing laminates. Thus, the present invention further provides a laminate comprising a synthetic layer and a metal layer, wherein the synthetic layer is made from the above prepregs. The laminate may be prepared by the following process: superimposing a plurality of prepregs and superimposing a metal foil (such as a copper foil) on at least one external surface of the superimposed prepregs to provide a superimposed object; performing a hot-pressing operation onto the superimposed object to obtain the laminate. Moreover, a printed circuit board can be obtained by further making a pattern on the metal foil of the laminate.

The present invention will be further illustrated by the embodiments hereinafter, wherein the measuring instruments and methods are respectively as follows:

[H$_2$O Absorption Test]
The moisture resistance of the laminate is tested by pressure cooker test (PCT), i.e., subjecting the laminate into a pressure container (121° C., 100% R.H. and 1.2 atm) for 2 hours.

[Solder Resistance Test]
The solder resistance test is carried out by immersing the dried laminate in a solder bath at 288° C. for a while and observing whether there is any defect such as delamination and expansion.

[Peeling Strength Test]
Peeling strength refers to the bonding strength between a metal foil and a laminated prepreg, and which is usually expressed by the force required for vertically peeling the clad copper foil with a width of ⅛ inch from the surface of the laminated prepreg.

[Glass Transition Temperature Test]
Glass transition temperature (Tg) is measured by using a Differential Scanning calorimeter (DSC), wherein the measuring methods are IPC-TM-650.2.4.25C and 24C testing method of the Institute for Interconnecting and Packaging Electronic Circuits (IPC).

[Flame Retardance Test]
The flame retardance test is carried out according to UL94V (Vertical Burn), which comprises the burning of a laminate, which is held vertically, using a Bunsen burner to compare its self-extinguishing properties and combustion-supporting properties.

[Dielectric Constant and Dissipation Factor Measurement]
Dk and Df are measured according to ASTM D150 under an operating frequency of 1 GHz.

[Chemical Resistance Test]
The laminate is immersed in a potassium permanganate solution and then neutralized. The neutralized laminate is dried and weighted to determine the weight loss before and after the immersion so as to calculate the level of the solution etching resistance of the laminate.

[Toughness Test]
The method for testing the toughness comprises the following steps: laying the laminate on a plane fixture; vertically placing a cross metal jig to come into contact with the surface of the laminate while applying a vertically-applied pressure to the cross metal jig; removing the cross metal jig; and observing the cross trace on the substrate. The laminate without any white embossing lines is regarded as having "good toughness," the one with slight white embossing lines is regarded as having "normal toughness," and the one with cracks or rupturing one is regarded as having "poor toughness."

EXAMPLES

Preparation of the Resin Composition

Example 1

According to the ratio shown in Table 1, polyphenylene ether resin of the above described formula (I) (R1 and R2 are CH$_3$, and A1 and A2 are

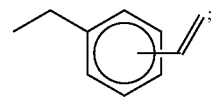

Mitsubishi Gas Chemical, OPE-1200), Ricon 130 as the nonpolar vinyl-containing elastomer (Cray Valley), benzoperoxide as the initiator (Fluka), decabromobibenzyl as the flame retardant (Albermarle) and silica powder as the filler (Denka) were mixed under room temperature with a stirrer for about 60 minutes followed by adding toluene and γ-butyrolactone (all Fluka) thereinto. After stirring the resultant mixture under room temperature for about 120 minutes, resin composition 1 was obtained.

Example 2

The preparation procedures of Example 1 were repeated to prepare resin composition 2, except that Ricon 130 was replaced with Cariflex IR (Kraton) as the nonpolar vinyl-containing elastomer and the amount was adjusted as shown in Table 1.

Example 3

The preparation procedures of Example 1 were repeated to prepare resin composition 3, except that the mixture of Ricon 130 and Ricon 157 (Cray Valley) was used as the nonpolar vinyl-containing elastomer and the amount was adjusted as shown in Table 1.

Example 4

The preparation procedures of Example 1 were repeated to prepare resin composition 4, except that the amount of Ricon 130 was adjusted and TAIC resin (Aldrich) was added as the cross-linking agent as shown in Table 1.

Example 5

The preparation procedures of Example 1 were repeated to prepare resin composition 5, except that the amount of Ricon 130 was adjusted and TAIC resin (Aldrich) and BMI resin with formula (II) (R" is $CH_2$, Diwakasi) were added as the cross-linking agent as shown in Table 1.

Comparative Example 1

The preparation procedures of Example 1 were repeated to prepare comparative resin composition 1, except that Ricon 130 was replaced with Ricon 130 MA8 (Cray Valley), a polar vinyl-containing elastomer, as shown in Table 1.

Comparative Example 2

The preparation procedures of Example 1 were repeated to prepare comparative resin composition 2, except that Ricon 130 was replaced with Ricon 157, a vinyl-containing elastomer with a content of vinyl group of 70% and the amount of Ricon 157 was adjusted as shown in Table 1.

Comparative Example 3

The preparation procedures of Example 1 were repeated to prepare comparative resin composition 3, except that the amount of Ricon 130 (a nonpolar vinyl-containing elastomer) was adjusted to be 70 weight by part as shown in Table 1.

TABLE 1

| function | component | Example 1 | Example 2 | Example 3 | Example 4 | Example 5 | Example 6 | Comparative example 1 | Comparative example 2 | Comparative example 3 |
|---|---|---|---|---|---|---|---|---|---|---|
| component (a) | polyphenylene ether resin | 60 | 60 | 60 | 60 | 60 | 60 | 60 | 60 | 60 |
| component (b): nonpolar vinyl-containing elastomer | Ricon 130 (28% vinyl group) | 8 | 0 | 6 | 10 | 6 | 6 | 0 | 0 | 70 |
| | Cariflex IR (6.5% vinyl group) | 0 | 12 | 0 | 0 | 0 | 0 | 0 | 0 | 0 |
| | Ricon 157 (70% vinyl group) | 0 | 0 | 1 | 0 | 0 | 0 | 0 | 10 | 0 |
| | content of vinyl group (%) weight of elastomer) | 28 | 6.5 | 34 | 28 | 28 | 28 | 0 | 70 | 28 |
| polar vinyl-containing elastomer | Ricon 130MA8 | 0 | 0 | 0 | 0 | 0 | 0 | 8 | 0 | 0 |
| cross-linking agent | TAIC resin | 0 | 0 | 0 | 23 | 0 | 18 | 0 | 0 | 0 |
| | BMI resin | 0 | 0 | 0 | 0 | 15 | 10 | 0 | 0 | 0 |
| compound (c): initiator | benzoperoxide | 1.4 | 2.5 | 1.6 | 1.8 | 1.4 | 0.8 | 2.5 | 2.0 | 2.5 |
| flame retardance | decabromobibenzyl | 16 | 16 | 16 | 16 | 16 | 16 | 16 | 16 | 25 |
| filler | silica powder | 20 | 20 | 20 | 20 | 20 | 20 | 20 | 20 | 20 |
| solvent | toluene | 60 | 60 | 60 | 60 | 60 | 60 | 60 | 60 | 60 |
| | γ-butyrolactone | 60 | 60 | 60 | 60 | 60 | 60 | 60 | 60 | 60 |

Ricon 130 was adjusted and BMI resin with formula (II) (R" is $CH_2$, Diwakasi) was added as the cross-linking agent as shown in Table 1.

Example 6

The preparation procedures of Example 1 were repeated to prepare resin composition 6, except that the amount of Ricon 130 was adjusted and TAIC resin (Aldrich) and BMI resin with formula (II) (R" is $CH_2$, Diwakasi) were added as the cross-linking agent as shown in Table 1.

[Preparation of the Laminate]

The laminates were prepared using resin compositions 1 to 6 and comparative resin compositions 1 to 3, respectively. In detail, one of those resin compositions was coated on 2116 reinforced glass fiber cloths by a roller. The coated 2116 reinforced glass fiber cloths were then placed in an oven and dried at 175° C. for 2 to 10 minutes to produce a prepregs in a half-hardened state (resin content: about 50%).

Four pieces of the prepregs were superimposed and two sheets of copper foil (0.5 oz.) were respectively superimposed on the two external surfaces of the superimposed prepregs to provide a superimposed object. A hot-pressing operation was performed on each of the prepared objects to provide laminates 1 to 6 (corresponding to resin compositions 1 to 6), and comparative laminates 1 to 3 (corresponding to comparative resin compositions 1 to 3). Herein, the hot-pressing conditions are as follows: raising the temperature to about 200° C. to 220° C. with a heating rate of 3.0° C./min, and hot-pressing for 120 minutes under the full pressure of 15 kg/cm² (initial pressure is 8 kg/cm²) at said temperature.

The H₂O absorption, solder resistance, peeling strength, glass transition temperature (Tg), flame retardance, dielectric constant (Dk), dissipation factor (Df), chemical resistance, and toughness of laminates 1 to 6 and comparative laminates 1 to 3 were analyzed and the results are tabulated in Table 2.

as shown by comparative example 3, if the amount of the nonpolar vinyl-containing elastomer is too high (over the amount of polyphenylene ether resin), it is disadvantageous to the physicochemical properties of the manufactured laminate.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

TABLE 2

|  | unit | Example 1 | Example 2 | Example 3 | Example 4 | Example 5 | Example 6 | Comparative example 1 | Comparative example 2 | Comparative example 3 |
| --- | --- | --- | --- | --- | --- | --- | --- | --- | --- | --- |
| H₂O absorption | % | 0.32 | 0.32 | 0.34 | 0.32 | 0.34 | 0.29 | 0.42 | 0.39 | 0.41 |
| solder resistance | minute | >10 | >10 | >10 | >10 | >10 | >10 | <3 | <8 | <1 |
| peeling strength | pound/inch | >5 | >5 | >5 | >5 | >5 | >5 | 3.8 | 4.2 | 2.8 |
| glass transition temperature (Tg) | ° C. | 179 | 175 | 177 | 185 | 193 | 199 | 170 | 173 | 142 |
| flame retardance (UL 94) | grade | 94V0 | 94V0 | 94V0 | 94V0 | 94V0 | 94V0 | 94V0 | 94V0 | 94V0 |
| dielectric constant (Dk) | 1 GHz | 3.67 | 3.67 | 3.66 | 3.62 | 3.67 | 3.62 | 3.75 | 3.69 | 3.65 |
| dissipation factor (Df) | 1 GHz | 0.0037 | 0.0038 | 0.0037 | 0.0033 | 0.0037 | 0.0032 | 0.0046 | 0.0039 | 0.0036 |
| chemical resistance | mg/dm³ | 0.016 | 0.018 | 0.017 | 0.016 | 0.017 | 0.015 | 0.024 | 0.018 | 0.033 |
| toughness | relative toughness | good | good | good | good | good | good | poor | good | good |

As shown in Table 2, laminates 1 to 6 manufactured by using the resin compositions of the present invention are provided with satisfactory physicochemical properties and electrical properties (such as moisture resistance, flame retardance, Dk, Df, etc.), and outstanding heat resistance (high Tg, and excellent solder resistance). Thus, the resin composition of the present invention can be more extensively used. In the case of further adding the cross-linking agent (examples 4 to 6), the heat resistance of the manufactured laminate is further enhanced (higher Tg). Especially, the embodiment of combining TAIC and BMI cross-linking agents (example 6) provides significant increase in the heat resistance and the most preferred electrical properties (Dk and DO. As compared with the laminates manufactured by the resin compositions of the present invention, because comparative example 1 utilizes a polar vinyl-containing elastomer, the manufactured laminate is apparently provided with poorer physicochemical properties and electrical properties. Although comparative example 2 uses a nonpolar vinyl-containing elastomer, the content of the vinyl group is more than 60% (to 70%). Therefore, the physicochemical properties and electrical properties of the manufactured laminate of comparative example 2 are poorer than that of the resin compositions of the present invention. Also,

What is claimed is:
1. A resin composition, comprising:
(a) a resin of formula (I):

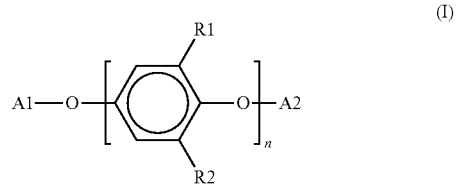

(b) a nonpolar vinyl-containing elastomer selected from the group consisting of polybutadiene, polyisoprene, styrene-containing polymers, and combinations thereof, wherein the content of the vinyl group contained in the elastomer is no more than 60%;
(c) a peroxide as a polymerization initiator;
a cross-linking agent selected from the group consisting of bismaleimide (BMI) resins, triallyl isocyanurate (TAIC), and a combination thereof, wherein the amount of the cross-linking agent is 10% to 200% based on the weight of component (a); and
a solvent which can dissolve or disperse the components of the resin composition but does not react with the components of the resin composition, wherein,
R1 and R2 are independently H or a substituted or unsubstituted methyl group;
A1 and A2 are independently

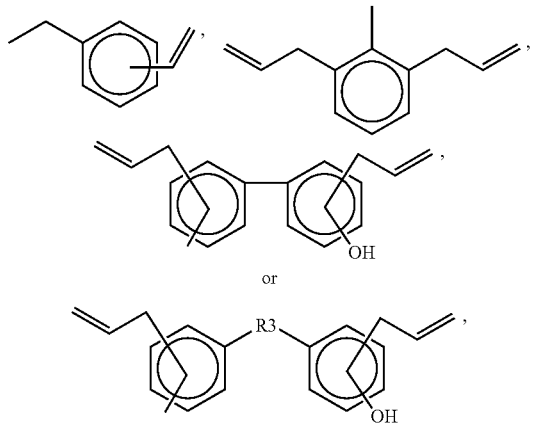

or wherein R3 is —O— or —SO$_2$—;
n is an integer ranging from 10 to 40;
the amount of component (b) is 2% to 50% based on the weight of component (a);
the amount of component (c) is 0.01% to 4% based on the total weight of component (a) and component (b); and
the resin composition does not include a polar vinyl-containing elastomer.

2. The resin composition of claim 1, wherein the styrene-containing polymer is a butadiene-styrene copolymer or a styrene-isoprene copolymer.

3. The resin composition of claim 1, wherein both R1 and R2 are —CH$_3$, and both A1 and A2 are

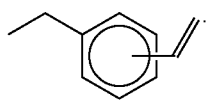

4. The resin composition of claim 1, wherein the amount of component (b) is about 5% to about 50% based on the weight of component (a).

5. The resin composition of claim 1, wherein the bismaleimide resin has the structure of formula (II):

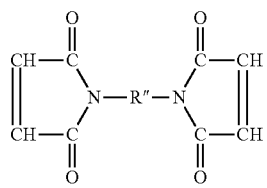

(II)

wherein, R″ is substituted or unsubstituted methylene, 4,4′-diphenylmethane, m-phenylene, bisphenol A diphenyl ether, 3,3′-dimethyl-5,5′-diethyl-4,4′-diphenyl methane, 4-methyl-1,3-phenylene, or (2,2,4-trimethyl) hexane.

6. The resin composition of claim 5, wherein R″ is CH$_2$,

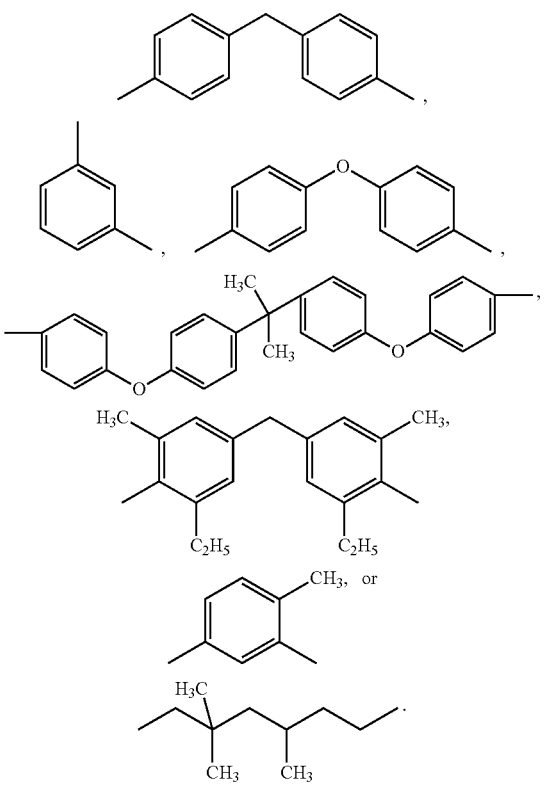

7. The resin composition of claim 1, further comprising an additive selected from the group consisting of a hardening promoter, a filler, a dispersing agent, a flexibilizer, a flame retardant, and combinations thereof.

8. The resin composition of claim 7, wherein the flame retardant is a phosphorus flame retardant or bromine-containing flame retardant, and the filler is selected from a group consisting of silica, glass powder, talc, kaolin, pryan, mica, inorganic metal oxide(s), and combinations thereof.

9. A prepreg, which is prepared by immersing a substrate into the resin composition of claim 1, and drying the immersed substrate.

10. A laminate, comprising a synthetic layer and a metal layer, wherein the synthetic layer is made from the prepreg of claim 9.

* * * * *